US011489487B2

(12) United States Patent
Al-Otaibi

(10) Patent No.: US 11,489,487 B2
(45) Date of Patent: Nov. 1, 2022

(54) ROBOTIC SOLAR PANEL CLEANING SYSTEM

(71) Applicant: Saudi Arabian Oil Company, Dhahran (SA)

(72) Inventor: Abdullah M. Al-Otaibi, Khobar (SA)

(73) Assignee: Saudi Arabian Oil Company, Dhahran (SA)

( * ) Notice: Subject to any disclaimer, the term of this patent is extended or adjusted under 35 U.S.C. 154(b) by 204 days.

(21) Appl. No.: 16/983,427

(22) Filed: Aug. 3, 2020

(65) Prior Publication Data

US 2020/0366235 A1 Nov. 19, 2020

Related U.S. Application Data

(63) Continuation of application No. 15/668,873, filed on Aug. 4, 2017, now Pat. No. 10,771,008.

(51) Int. Cl.
*H02S 40/10* (2014.01)
*F24S 40/20* (2018.01)
(Continued)

(52) U.S. Cl.
CPC ............... *H02S 40/10* (2014.12); *A46B 7/04* (2013.01); *A46B 13/04* (2013.01);
(Continued)

(58) Field of Classification Search
CPC ............... A46B 13/04; A46B 15/0006; A46B 2200/3073; A46B 7/04; B08B 1/002;
(Continued)

(56) References Cited

U.S. PATENT DOCUMENTS 8,240,320 B2  8/2012  Mertins et al.
8,500,918 B1  8/2013  Meller et al.
(Continued)

FOREIGN PATENT DOCUMENTS

CN    201389533 Y    1/2010
CN    204145388 U    2/2015
(Continued)

OTHER PUBLICATIONS

Chinese Office Action in Corresponding Chinese Patent Application No. 201880047776.5 dated Feb. 19, 2021. 16 pages.
(Continued)

*Primary Examiner* — Douglas Lee
(74) *Attorney, Agent, or Firm* — Leason Ellis LLP

(57) ABSTRACT

A cleaning system for a solar panel is provided. The cleaning system comprises: i) a frame moveable in a transverse direction over the solar panel, the frame having edges oriented in the transverse direction; a brush assembly positioned within the frame and moveable in a longitudinal direction including a plurality brush holders arranged within the frame, with each brush holder being adapted to interchangeably receive a brush for cleaning the solar panel; and a liquid spray arrangement including nozzles arranged one or more rows for spraying at least one of water and a water detergent mix onto the solar panel. The liquid spray arrangement includes nozzles positioned near at least one of the transverse edges of the frame for spraying the water detergent mix onto a longitudinal end of the brush assembly.

7 Claims, 7 Drawing Sheets

(51) Int. Cl.
*A46B 7/04* (2006.01)
*A46B 13/04* (2006.01)
*A46B 15/00* (2006.01)
*B08B 1/00* (2006.01)
*B08B 3/08* (2006.01)
*B08B 5/02* (2006.01)
*F24S 50/00* (2018.01)

(52) U.S. Cl.
CPC ......... *A46B 15/0006* (2013.01); *B08B 1/002* (2013.01); *B08B 1/008* (2013.01); *B08B 3/08* (2013.01); *B08B 5/02* (2013.01); *F24S 40/20* (2018.05); *F24S 50/00* (2018.05); *A46B 2200/3073* (2013.01)

(58) Field of Classification Search
CPC ... B08B 1/008; B08B 3/08; B08B 5/02; F24S 40/20; F24S 50/00; H02S 40/10; Y02E 10/40; Y02E 10/50
See application file for complete search history.

(56) References Cited

U.S. PATENT DOCUMENTS

| | | | |
|---|---|---|---|
| 8,689,393 | B2 | 4/2014 | Ota |
| 8,771,432 | B2 | 7/2014 | Meller et al. |
| 9,016,292 | B1 | 4/2015 | Schneider et al. |
| 9,020,636 | B2 | 4/2015 | Tadayon |
| 9,079,226 | B2 | 7/2015 | Ike et al. |
| 9,126,341 | B1 | 9/2015 | Meller et al. |
| 9,130,502 | B1* | 9/2015 | Aly ................ F26B 21/004 |
| 9,276,523 | B1 | 3/2016 | Berendez |
| 9,443,992 | B2 | 9/2016 | Adler et al. |
| 9,584,064 | B2 | 2/2017 | Suresh et al. |
| 2003/0140942 | A1 | 7/2003 | Rajala et al. |
| 2009/0266353 | A1 | 10/2009 | Lee |
| 2013/0305474 | A1* | 11/2013 | Meller ................ B08B 1/008 15/246 |
| 2014/0109334 | A1 | 4/2014 | Saraf |
| 2015/0244311 | A1* | 8/2015 | Nakagawa ................ B08B 1/04 134/180 |
| 2015/0034970 | A1 | 12/2015 | Grossman et al. |
| 2017/0331417 | A1 | 11/2017 | Wang et al. |

FOREIGN PATENT DOCUMENTS

| | | | | |
|---|---|---|---|---|
| CN | 204206101 | U | | 3/2015 |
| CN | 105834188 | A | * | 8/2016 ........... A46B 11/063 |
| CN | 105934188 | A | | 9/2016 |
| CN | 105834188 | A1 | | 10/2016 |
| JP | 2002273351 | A | | 9/2002 |
| JP | 2017511119 | A | | 4/2017 |
| JP | 2017109160 | A | | 6/2017 |
| KR | 20090062117 | A1 | | 6/2009 |
| KR | 1020090062117 | A | | 6/2009 |
| KR | 20090090722 | A | | 8/2009 |
| KR | 20170059694 | A1 | | 5/2017 |
| KR | 1020170059694 | A | | 5/2017 |
| WO | 2011128084 | A2 | | 10/2011 |
| WO | 20120123979 | A2 | | 9/2012 |

OTHER PUBLICATIONS

International Preliminary Report on Patentability in Corresponding PCT Application No. PCT/US2018/045383 dated Aug. 26, 2019. 21 pages.
International Search Report and Written Opinion in Corresponding PCT Application No. PCT/US2018/045383 dated Oct. 29, 2018. 148 pages.
Office Action in corresponding Japanese Application No. 2020-505430, dated Mar. 7, 2022; 16 pages.
Singapore Written Opinion in Corresponding Singapore Application No. 11202000320W dated Feb. 5, 2021. 5 pages.

* cited by examiner

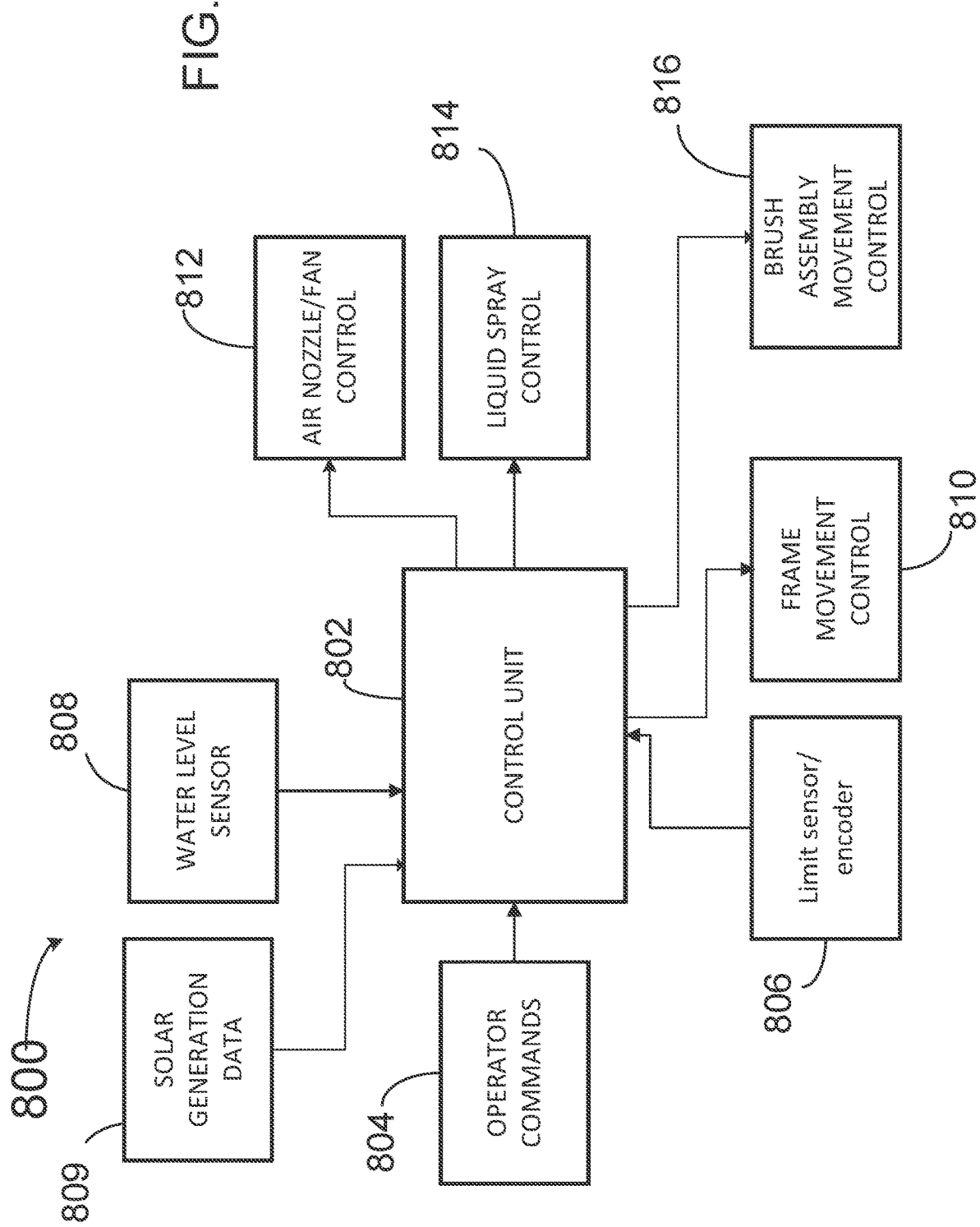

ROBOTIC SOLAR PANEL CLEANING SYSTEM

CROSS-REFERENCE TO RELATED PATENT APPLICATIONS

This is a Continuation of U.S. application Ser. No. 15/668,873, filed Aug. 4, 2017, which is hereby incorporated by reference in its entirety.

FIELD OF THE INVENTION

The present invention relates to a generation of electrical energy through use of photovoltaic solar panels, and in particular relates to a system for cleaning solar panels to improve their efficiency.

BACKGROUND OF THE INVENTION

Renewable sources of energy including solar energy are becoming an ever greater part of the energy mix throughout the world. Most solar energy capture is performed using panels of photovoltaic solar cells. The panels are typically covered with transparent glass coverings to protect the solar cells direct exposure to the environment. However, the glass coverings can accumulate dirt, organic matter, sand, mud, fungal growth, and other debris over time which reduces the electrical generation efficiency of the solar panels which they cover. Examples of accumulation on panel coverings are shown in FIGS. 1 and 2. FIG. 1 shows a solar panel covered over a majority of its surface with a loose layer of dirt such as dust or sand. FIG. 2 shows another solar panel with a surface covered with streaks of residue with marked accumulation near the edge of the panel. Residue such as shown in FIG. 2 tends to adhere to the solar panel covering and can be challenging to remove. Various studies show that dirt accumulation can reduce solar panel output power by up to 80%. Moreover, it has been found that small particles have a particularly deleterious effect on power output. For example, Kuwait City recorded a reduction in solar panels power by 17% due to sand accumulation after six days.

The conventional methods and systems for cleaning and maintaining solar panels that have been employed to date generally either fall short in their cleaning efficiency, clean some times of accumulations better than others, lack durability, or suffer from other handicaps such as high water requirements, which can be undesirable in environments that have limited access to water such as deserts.

It would therefore be advantageous to provide a solar panel cleaning system that is efficient, requires small volumes of water and is both adaptable and durable. The present disclosure addresses these and other deficiencies in the art.

SUMMARY OF THE INVENTION

Embodiments of the present invention provide a cleaning system for a solar panel. The cleaning system comprises: i) a frame moveable in a transverse direction over the solar panel, the frame having transverse edges oriented in the transverse direction; ii) a brush assembly positioned within the frame and moveable in a longitudinal direction that includes a plurality brush holders arranged within the frame, with each brush holder being adapted to interchangeably receive a brush for cleaning the solar panel; and iii) a liquid spray arrangement including nozzles arranged in at least one row for spraying at least one of water and a water detergent mix onto the solar panel. The liquid spray arrangement includes nozzles positioned near at least one of the transverse edges of the frame for spraying the at least one of water and the water detergent mix onto a longitudinal end of the brush assembly.

In some embodiments, the liquid spray arrangement includes a plurality of rows of nozzles positioned within the frame that are oriented in the transverse direction.

The cleaning system of the present invention can also include a forced air arrangement for applying forced air onto the solar panel. In some implementations, the forced air arrangement includes a plurality of nozzles oriented to apply pressurized air onto the solar panel. In other implementations, the forced air arrangement includes a plurality of fans situated within the frame at various longitudinal positions. Combinations of nozzles and fans can also be used.

Embodiments of the cleaning system further comprise support bars for moveably supporting the frame as it moves over the solar panel. The cleaning system can include a pulley system that is adapted to drive the frame relative to the support bars. In some implementations, the cleaning system can be powered using an independent power supply that is active while the solar panel(s) themselves are inoperative.

The cleaning system according to the present invention can also include a second pulley system for moving the brush holders within the brush assembly relative to the frame. The second pulley system drives the brush holders in the longitudinal direction.

Further embodiments of the cleaning system comprise a first sensor for determining a location of the frame relative to the support bars and a control unit coupled to the sensor and configured to reverse the transverse direction of travel of the frame when it receives data from the sensor indicating that the frame has reached a position limit of a pass over the solar panel.

Some implementations include a second sensor for determining an amount of water available to the cleaning system. In such implementations, the control unit can be coupled to the second sensor and configured to reduce the use of the liquid spray arrangement upon receipt of data indicating low water availability. The control unit also can be coupled to a diagnostic module that provides efficiency data for the solar panel. The control unit can be configured to activate or deactivate at least one of the liquid spray arrangement or the forced air arrangement depending upon received efficiency data.

Embodiments of the present invention also include a method of cleaning a solar panel that comprises: i) providing a brush assembly including a plurality of brush holders adapted to receive interchangeable brushes, in which the brush assembly being incorporated in a frame; ii) moving the frame together with the brush assembly over a surface of the solar panel while contacting the brushes with the surface of the solar panel; iii) moving the brushes relative to the frame within the brush assembly; and iv) spraying a water detergent mixture onto the solar panel to dislodge debris and onto the brush assembly to clean the brushes.

In some embodiments the cleaning method further includes applying forced air onto the solar panel to further dislodge debris from the solar panel.

In some implementations, the water detergent mixture is sprayed from at least one row of nozzles oriented along a direction of motion of the frame.

In further embodiments, the cleaning method also includes receiving information regarding a power generating efficiency of the solar panel and controlling the spraying of the water detergent mixture and application of forced air onto the solar panel based on the received information regarding the power generating efficiency of the solar panel. In some implementations, the method also includes controlling the motion of the frame based on the received information regarding the power generating efficiency of the solar panel. In further implementations, when the frame has reached a positional limit in its motion over solar panel it is detected and the direction of motion of the frame is reversed if the limit has been reached. In addition the level of water available for cleaning the solar panel can be detected and the spraying of the water detergent mixture onto the solar panel can be controlled based on a detected level of water available.

Any combinations of the various embodiments and implementations disclosed herein can be used.

These and other aspects, features, and advantages can be appreciated from the following description of certain embodiments of the invention and the accompanying drawing figures and claims.

BRIEF DESCRIPTION OF THE DRAWINGS

FIG. 8 is a schematic block diagram of an exemplary embodiment of a control system for operating a cleaning system according to the present invention.

It is noted that the drawings are illustrative and not necessarily to scale.

DETAILED DESCRIPTION CERTAIN OF EMBODIMENTS OF THE INVENTION

By way of overview, the present disclosure describes an online cleaning system that cleans and maintains solar panels in an efficient condition while the solar panels are operable. The cleaning system includes an adjustable frame and replaceable cleaning elements and is therefore adaptable for application to solar panels of different sizes and arrangements.

Figure 3:
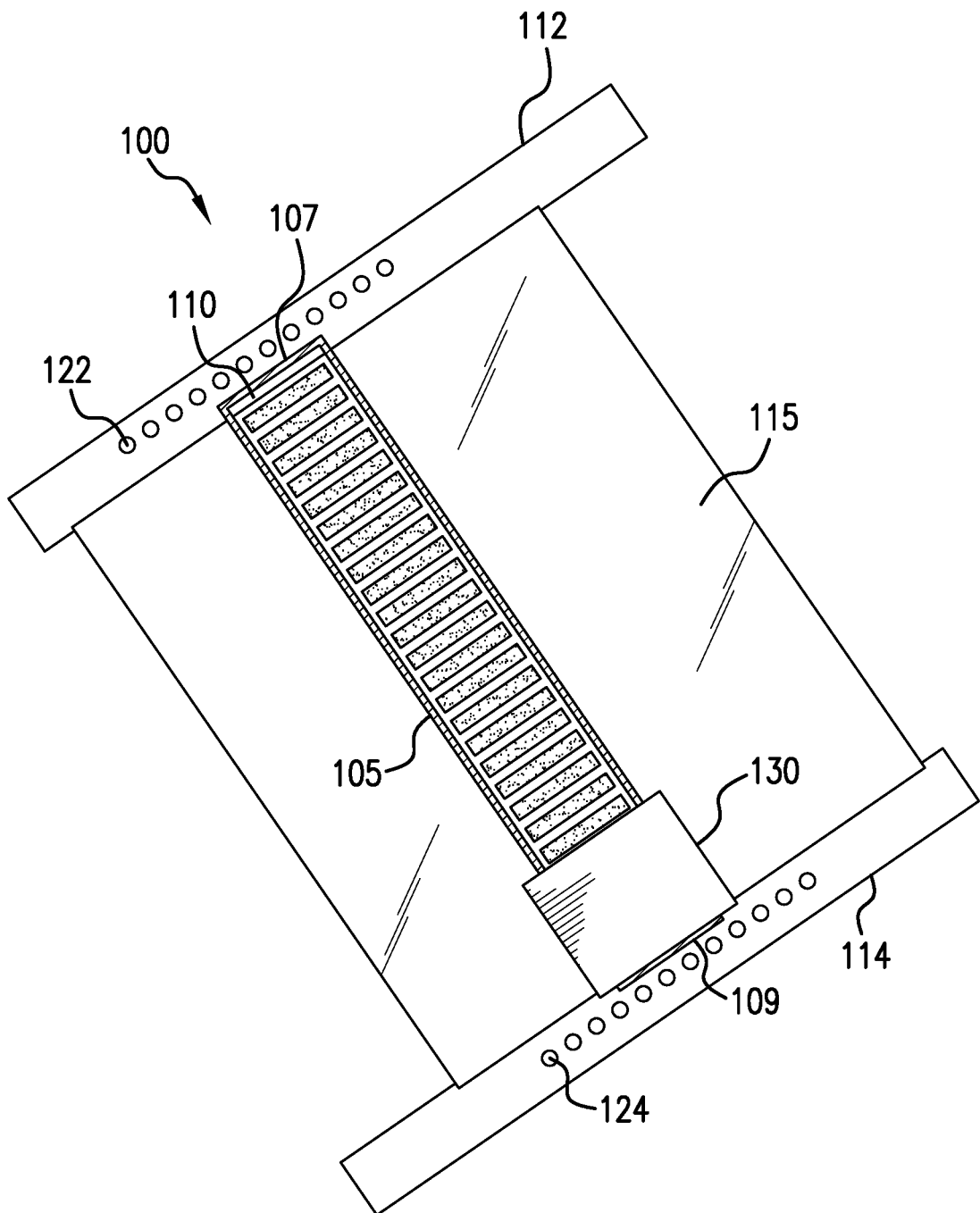
FIG. 3 is a schematic top view of an embodiment of a solar panel cleaning system according to an embodiment of the present invention.

FIG. 3 is a schematic top view of a cleaning system according to an embodiment of the present invention. Cleaning system 100 includes a rectangular frame 105 that is elongated along one dimension, denoted as the longitudinal axis. Frame 105 has a first longitudinal end 107 and a second longitudinal end 109 and encloses a brush assembly 110. The first end 107 is moveably coupled to a first support bar 112, and the second end 109 is moveably coupled to a second support bar 114. The frame 105 is movable in forward and reverse directions along the support bars 112, 114 along the orientation denoted as the transverse axis. A motorized pulley system or similar motive mechanism (not shown in FIG. 3) is used to power the movement of the frame along the support bars 112, 114. The frame 105 is shown installed over a solar panel 115. Solar panel has a surface area typically in a range of 0.5 to 2 square meters and is covered with a transparent protective covering made of glass. The length of the frame 105 is adjusted to approximately match the length of the panel 115. Solar panel 115 can be a single panel, but in most solar plants will be part of a row of similar panels ("solar row") that extend further along the transverse axis. The support bars 112, 114 can extend along the entire solar row and when this is the case frame 105 can be movable along the support bars 112, 114 to cover an entire solar row. A first row of spray nozzles 122 is coupled to or situated adjacent to support bar 112 is positioned so as to direct a spray of cleaning fluid toward the brush assembly 110 in proximity to the first end 107 of the frame. A second row of spray nozzles 124 coupled to or situated adjacent to support bar 114 is positioned so as to direct a spray of cleaning fluid toward the brush assembly 110 in proximity to the second end 109 of the frame. A power supply 130 positioned over frame 105 provides power for the cleaning system 100 and may also be part of a power supply system that powers other modules of the solar panel installation. The power supply 130 can be an additional dedicated solar cell that functions specifically to provide power for the cleaning system. Alternatively, power supply 130 can be implemented as a rechargeable supply. For example, power supply 130 can comprise a rechargeable battery that can be charged by one or more solar panels while the panels are operating and the energy stored by the battery can then be utilized by the cleaning system while the panels are offline.

Figure 4:
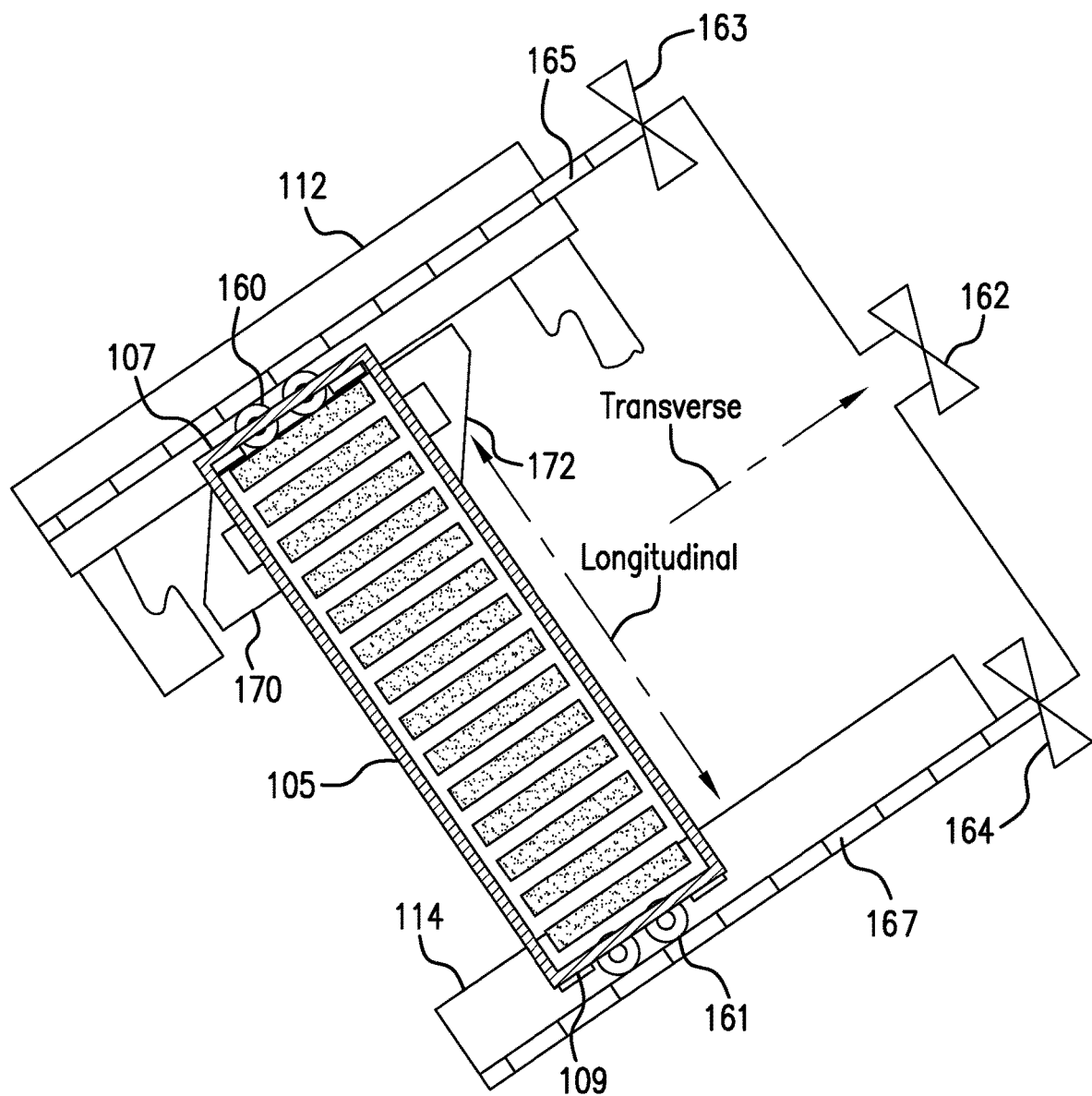
FIG. 4 is an enlarged view of the cleaning system shown in FIG. 3 with the underlying solar panel removed.

FIG. 4 is an enlarged view of the cleaning system shown in FIG. 3 with the underlying solar panel removed. As shown, the frame 105 is coupled at first end 107 to a first set of wheels 160 and at the second end 109 to a second set of wheels 161. The sets of wheels 160, 161 enable the frame 105 to slide horizontally (along the transverse axis) in contact with a rail, flange or similar traction surface on support bars 112, 114. In the embodiment depicted, sets of wheels 160, 161 are mounted so as to rotate in the plane of the frame 105 and solar panel (i.e., the axis of rotation of the wheels is perpendicular to the plane of the frame and solar panel). In other embodiments the sets of wheels 160, 161 can be mounted and oriented perpendicularly or otherwise to the orientation shown in FIG. 4.

In one embodiment of a driving mechanism, a motor (not shown) activates a drive pulley 162 that in turn activates first and second step pulleys 163, 164. Step pulley 163 drives step chain 165 on support bar 112 while step pulley 164 drives step chain 167 on support bar 114. This mechanism moves the wheels 160, 161 on the support bars 112, 114 which, in turn, pull the frame 105 across the solar panels in the forward and reverse directions. A first direction switch 170 is connected to the drive pulley 162 and is operative to cause the drive pulley 162 to drive step pulleys 163, 164 in a forward direction and second direction switch 172 is also connected to drive pulley 162 and is operative to cause the drive pulley 162 to drive step pulleys 163, 164 in a reverse direction. The direction switches 170, 172 can be activated by operator command or automatically using a control unit based on devices that detect the position of the frame 105. In some embodiments, limit sensors and/or encoders can be employed to determine the position of the frame with respect to support bars 112, 114. Signals from the detectors can be used by a control unit to determine whether the frame has made a complete pass over a length of solar panel, and if so, to reverse the direction of movement of the frame.

Figure 5:
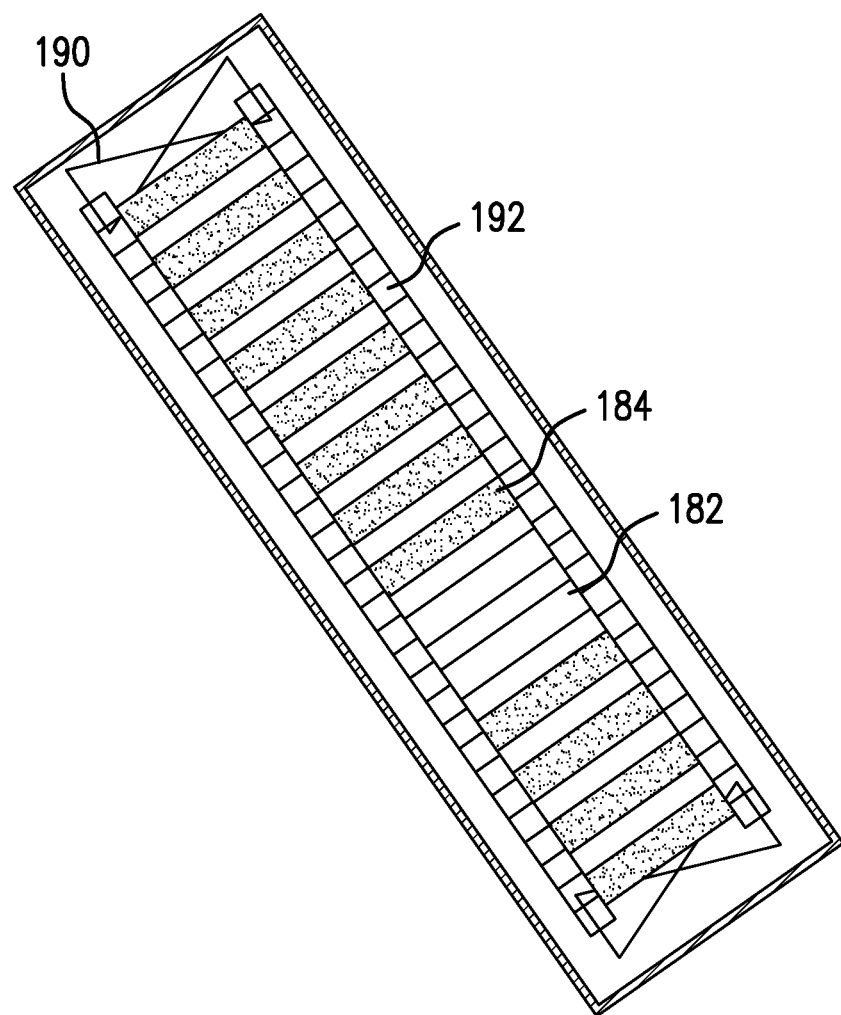
FIG. 5 is a schematic top view of a frame and brush assembly of a solar panel cleaning system according to an embodiment of the present invention.

FIG. 5 is a schematic top view of a frame 105 and brush assembly 110 according to an embodiment of the present invention. Enclosed within the frame 105 is a brush assembly 110 that comprises a set of brush holders e.g., 182, 184 arranged in longitudinal row along the substantial length of the frame. Each brush holder 182, 184 is configured to receive an interchangeable brush (not explicitly shown). The brushes are modular and adapted to be fitted onto the brush holders 182, 184 by snap-fit, tongue-in-groove, sleeve and other suitable coupling methods. In this manner, a variety of different types of brushes, such as soft microfiber, sponge and roper brushes can be replaceably incorporated in the brush assembly 110 in different sequences and locations. The brush assembly 110 as a whole is adapted to move in the longitudinal direction (perpendicular to the movement of the frame itself) via a mechanism such as a pulley 190 and chain 192. In some implementations, pulley 190 can be driven by the same drive pulley 162 that moves the frame 105, through intermediate transmission mechanisms. Other brush drive mechanisms can also be used. In the embodiment of FIG. 5, the brush holders 182, 184 are coupled directly to the chain 192. As the chain 190 is moved by the pulley 190, the brush holders are carried in the longitudinal direction. The chain 190 can be a conveyor-belt that moves the brushes in a continuous loop so that the individual brushes moves continuously and reach the end of a cleaning pass periodically. The brushes clean the solar panel as they are moved along the frame. When a brush reaches the edges of the frame, it is cleaned by being exposed to a forceful spray of a water/detergent mixture from the row of fluid spray nozzles 122 (in FIG. 3) positioned on or near the support bars. In some embodiments the direction of movement of the brush assembly can be unidirectional, and in other embodiments, a reverse mechanism is employed for bidirectional motion.

Figure 1:
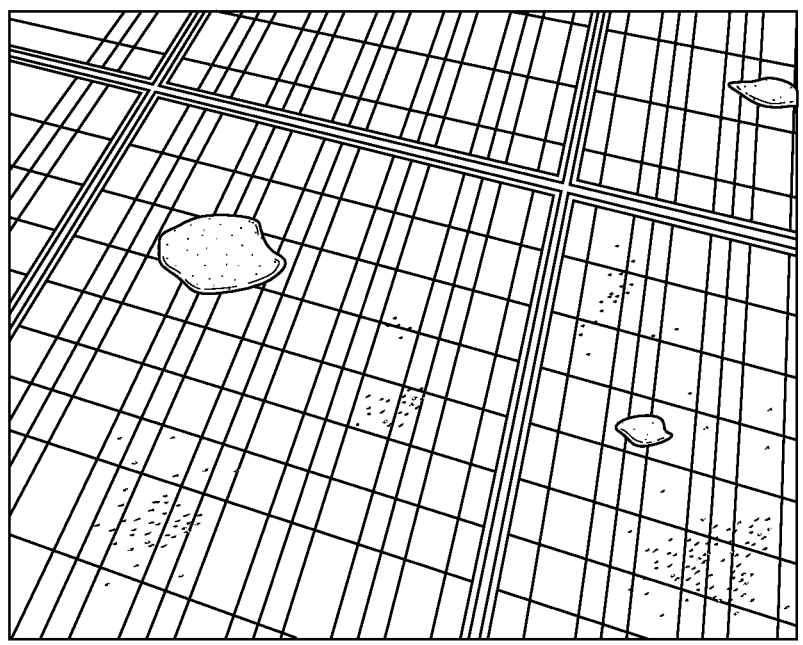
FIG. 1 is a perspective view of an example solar panel covered with loose debris.
Figure 2:
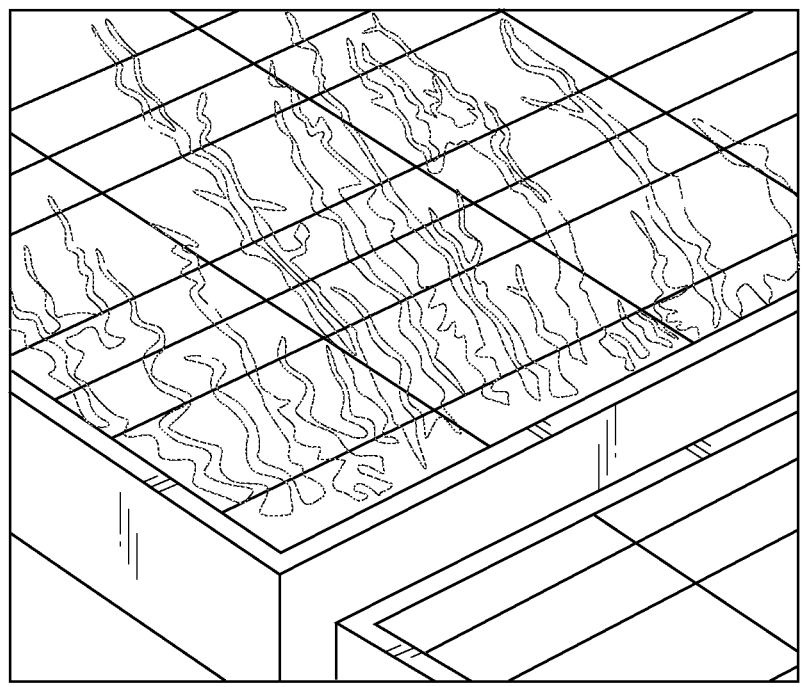
FIG. 2 is a perspective view of an example solar panel covered with a film of residue.
Figure 6:
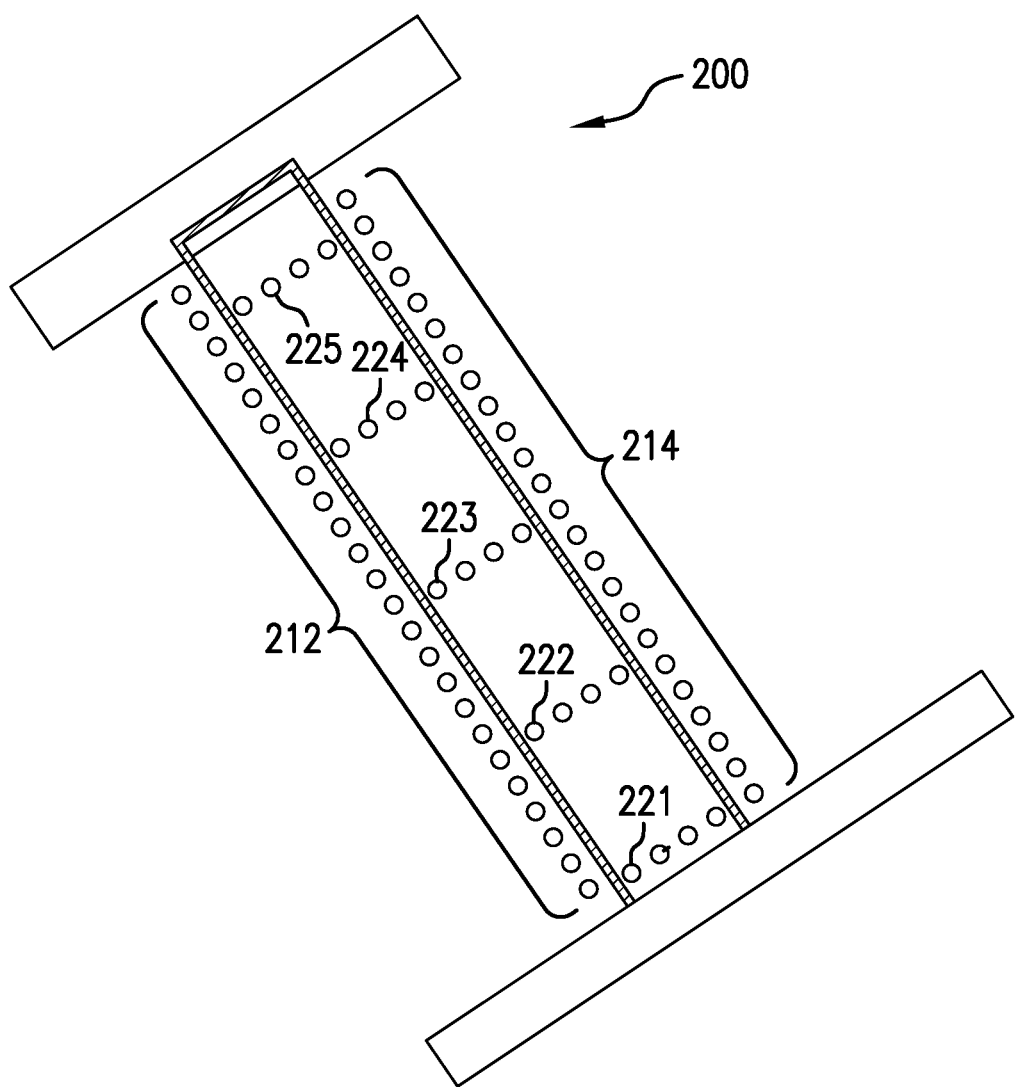
FIG. 6 is a schematic top view of an embodiment of a forced air and liquid spray system for dislodging dirt from solar panels according to the present invention.

A schematic top view of an embodiment of an air/liquid spray system 200 for the cleaning system according to the present invention is shown in FIG. 6. The system 200 includes a forced air venting or blowing arrangement ("forced air arrangement") for aiding in dislodging and moving dust particles ahead of the frame. System 200 also includes a liquid spray arrangement 215 which is adapted to supply a water-detergent mixture for similar cleaning purposes. In one embodiment, the forced air arrangement comprises a first set of air nozzles 212 arranged in a column adjacent to a first outer longitudinal edge of frame 105, and a second set of air nozzles 214 arranged in a column on the other outer longitudinal edge of frame 105. Although not shown in FIG. 6, both sets of nozzles 212, 214 are coupled to, and extend from, the frame 105. The sets of air nozzles 212, 214 are also in fluid communication with a source of forced air which can be distributed along the frame 105. In the depicted embodiment, liquid spray arrangement includes five rows of nozzles 221, 222, 223, 224 and 225 oriented horizontally along the transverse axis on the inside of frame 105. A smaller or larger number of nozzle rows (with different numbers of nozzles per row) can be used. The rows of nozzles 221-225 preferably spray a water/detergent mixture at a high pressure sufficient to cover and dislodge dirt and debris. It is noted that the volume of fluid used in spraying can be kept to a minimum in order to conserve water resources if and when required such as in arid environments. The liquid spray arrangement is in communication with water and detergent supply lines (not shown) that can also supply the brush cleaning nozzles 122 shown in FIG. 2.

Figure 7:
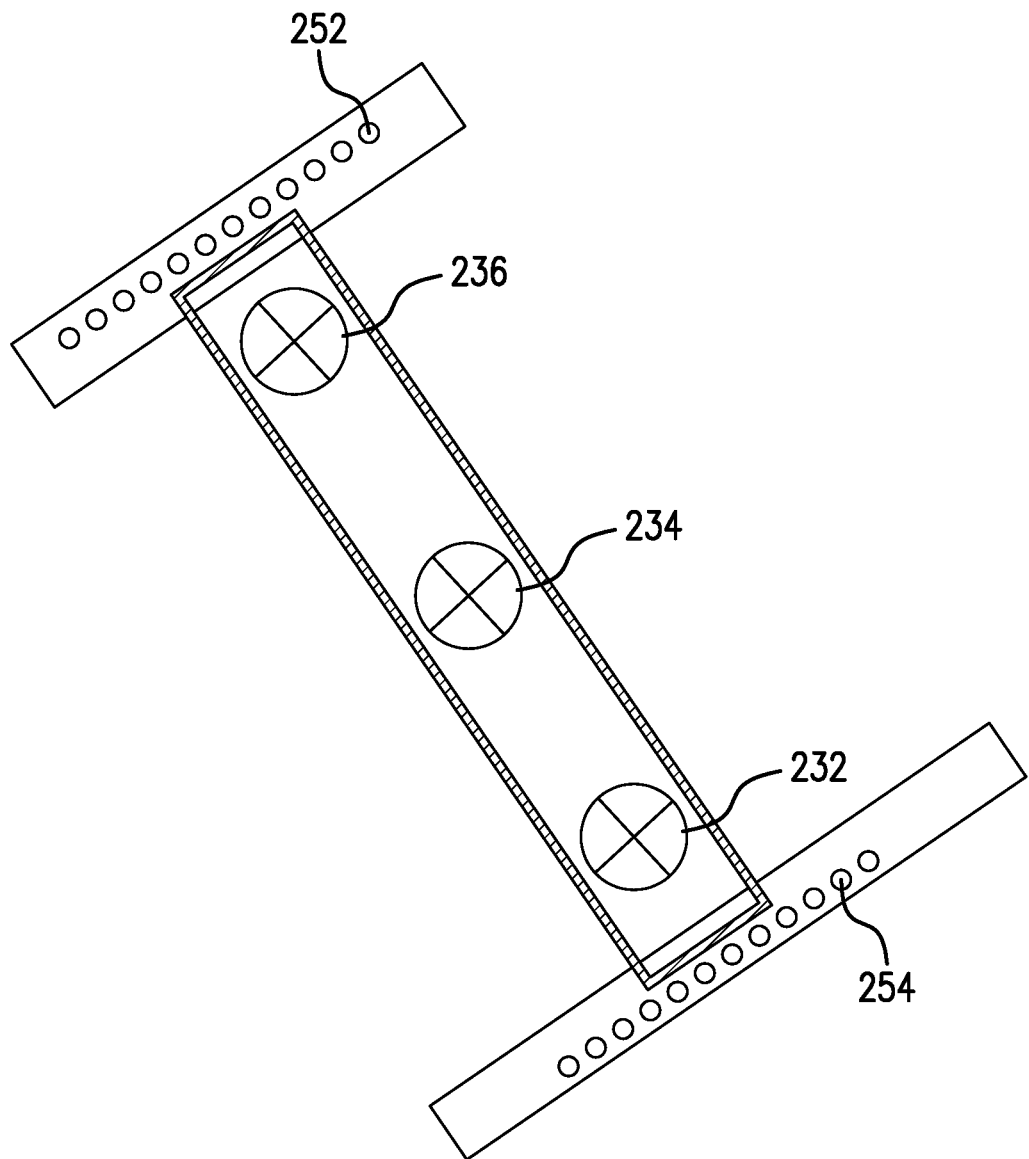
FIG. 7 is a schematic top view of an alternative embodiment of a forced air system for dislodging dirt from solar panels according to the present invention that employs fans.

In an alternative embodiment of the forced air arrangement shown in FIG. 7, fans 232, 234, 236 distributed longitudinally within the frame direct forced air toward the solar panel. Power for operating fans 232, 234, 236 can be provided by the solar panel or solar row when operational.

In another alternative embodiment, the liquid spray arrangement can comprise a standalone system such as a "sprinkler" spray that is distributed over the solar panels. In one implementation, a water supply pipe having holes facing the solar panels can be installed along the higher end of the solar row. As liquid flows through the pipe, it is ejected in the manner of a sprinkler through the holes onto the solar panel surface. In addition, the air and liquid supply lines that provide forced air and water/detergent for cleaning can be placed onto rollers moved by step chains to follow the path of the frame. As shown in FIG. 7 and noted previously, dedicated spray nozzles 252, 254 are positioned to clean the brushes in the brush assembly as they reach the end of each cleaning run through the frame.

FIG. 8 is a high-level block diagram of an embodiment of a control system 800 for operating the solar panel cleaning system according to the present invention. A control unit 802 which can be implemented as one or more processors and/or programming logic units (PLUs) and cache memory, is operative to generate commands for operating and receiving data from other devices of system 800. Control unit 802 generates commands either automatically or in responds to user (operator) commands 804 received either manually or via a remote device such as a smart phone. Control unit receives sensory input from several devices and delivers commands to a number of actuator devices to operate the cleaning system.

The sensor devices include a limit sensor or encoder 806 detects the relative position of the frame with respect to the support bars (and solar panel) and can also detect whether the frame has reached a preset limit in its direction movement with respect to a solar panel. A water level sensor 808 is connected to a water supply line and measures the amount of water available to the cleaning system. The water level sensor 808 can be a static gauge for measuring a level in a reservoir or a flow rate in a supply line, or can be an active component that communicates with other parts of a larger water supply system. The control unit 802 also receives solar generation efficiency data for the solar panels from a diagnostic module 809.

The actuator devices operated by the control unit 802 include the frame movement control 810 for moving the frame over the solar panel. As described above, the frame movement control 810 includes one or more actuators for operating motors, pulleys, chains, direction switches and/or other components that control the motion of the frame in forward and reverse directions. An air nozzle/fan control 812 includes actuators operative to, for example, open and close nozzles of the air nozzle system and/or activate or deactivate one or more fan elements. Similarly, a liquid spray control 814 includes actuators operative to open and close nozzles of the fluid spray system. A brush assembly movement control 816 includes the actuators for operating the pulley and chain that move brushes longitudinally within the frame of the cleaning system.

In operation, when the limit sensor/encoder 806 detects that the frame has completed a pass over a solar panel (or row) in the forward or reverse direction, this information is received by control unit 802, which can activate a direction switch to change the direction of motion of the frame. Similarly, when water level sensor 808 detects a low water level below a certain threshold and send this information to control unit 802, the control unit 802 can reduce the amount of water used in spraying during cleaning operations, reduce the frequency of cleaning operations, or stop operation entirety until water availability improves.

Additionally, by controlling the air/fluid spray system, control unit 802 can vary the amount and frequency of air applied based for example, on environmental conditions and information regarding efficiency of the solar panels. When it is determined that the panels are covered with a large amount of debris, air flow can be increased by activating (e.g., opening) air nozzles and/or increasing fan operation. Similarly, the control unit 802 can increase the amount of fluid spray applied to the solar panels and the amount of detergent applied in a water/detergent mixture through control of the spray nozzles of the liquid spray arrangement. Conversely, when the panels are relatively clean, the control unit 802 can reduce the amount of air flow and fluid spray by shutting one or more nozzles and/or decreasing fan operation of the forced air arrangement.

The cleaning systems disclosed herein have many advantages in terms of improving efficiency and reducing costs. Due to the fact that the brushes of the cleaning system are modular and replaceable, maintenance can be conducted easily and new brushes can be regularly substituted for older brushes that have become less efficient. Furthermore, the interchangeability of the brushes enables selection of a brush-type that is most suitable for the prevailing conditions at an installation. Additionally, the use of forced air helps prevent mechanical damage to panel surfaces by moving dust accumulation.

It is to be understood that any structural and functional details disclosed herein are not to be interpreted as limiting the systems and methods, but rather are provided as a representative embodiment and/or arrangement for teaching one skilled in the art one or more ways to implement the methods.

It is to be further understood that like numerals in the drawings represent like elements through the several figures, and that not all components and/or steps described and illustrated with reference to the figures are required for all embodiments or arrangements The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof.

Terms of orientation are used herein merely for purposes of convention and referencing, and are not to be construed as limiting. However, it is recognized these terms could be used with reference to a viewer. Accordingly, no limitations are implied or to be inferred.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

While the invention has been described with reference to exemplary embodiments, it will be understood by those skilled in the art that various changes may be made and equivalents may be substituted for elements thereof without departing from the scope of the invention. In addition, many modifications will be appreciated by those skilled in the art to adapt a particular instrument, situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A method of cleaning a solar panel comprising:
   providing a frame moveable in a transverse direction over the solar panel, the frame having transverse edges oriented in the transverse direction;
   providing a brush assembly positioned within the frame, the brush assembly including a plurality of brush holders arranged within the frame, the brush holders moveable in a longitudinal direction within the brush assembly, each brush holder being adapted to receive interchangeable brushes for cleaning the solar panel, the brush assembly being incorporated in the frame;
   providing a liquid spray arrangement including:
      a plurality of rows of nozzles positioned within the frame and oriented in the transverse direction, the plurality of rows of nozzles configured to spray at least one of water and a water detergent mix onto the solar panel; and
      at least one additional row of nozzles adjacent to at least one of the transverse edges of the frame, the at least one additional row of nozzles positioned such that as each one of the plurality of brush holders is moved in a longitudinal direction and reaches the end of the frame to be positioned adjacent to the at least one of the transverse edges of the frame, the nozzles of the at least one additional row of nozzles are configured to spray the at least one of water and the water detergent mix onto each one of the plurality of brush holders positioned adjacent to the transverse edges of the frame to directly clean the brushes or the solar panel;
   moving the frame together with the brush assembly over a surface of the solar panel while contacting the brushes with the surface of the solar panel;
   moving the brushes relative to the frame within the brush assembly; and
   spraying the at least one of water and the water detergent mixture from the liquid spray arrangement onto the solar panel to dislodge debris and onto the brush assembly to clean the brushes.

2. The method of claim 1, wherein the water detergent mixture is sprayed from the plurality of rows of nozzles oriented along a direction of motion of the frame.

3. The method of claim 1, further comprising applying forced air onto the solar panel to further dislodge debris from the solar panel.

4. The method of claim 3, further comprising:
   receiving information regarding an power generating efficiency of the solar panel; and
   controlling the spraying of the water detergent mixture and application of forced air onto the solar panel based on the received information regarding the power generating efficiency of the solar panel.

5. The method of claim 4, further comprising:
   controlling the motion of the frame based on the received information regarding the power generating efficiency of the solar panel.

6. The method of claim 1, further comprising:
detecting whether the frame has reached a positional limit in its motion over solar panel; and
reversing a direction of motion of the frame if the limit has been reached.

7. The method of claim 1, further comprising:
detecting a level of water available for cleaning the solar panel; and
controlling the spraying of the water detergent mixture onto the solar panel based on a detected level of water available.

* * * * *